United States Patent
Morrow

[11] Patent Number: 5,111,453
[45] Date of Patent: May 5, 1992

[54] APPARATUS AND METHOD FOR RECOGNIZING ADDRESSES OF INFORMATION PACKETS

[75] Inventor: Joel I. Morrow, Merrick, N.Y.

[73] Assignee: Nynex Corporation, New York, N.Y.

[21] Appl. No.: 525,957

[22] Filed: May 18, 1990

[51] Int. Cl.$^5$ .............................................. H04J 3/02
[52] U.S. Cl. ................................. 370/85.13; 370/94.1
[58] Field of Search ................ 370/85.13, 94.1, 85.14, 370/94.3

[56] References Cited

U.S. PATENT DOCUMENTS

| | | | |
|---|---|---|---|
| 4,627,052 | 12/1986 | Hoare et al. | 370/85.13 |
| 4,706,081 | 11/1987 | Hart et al. | 370/85.13 |
| 4,737,953 | 4/1988 | Koch et al. | 370/85.13 |
| 4,872,162 | 10/1989 | Tanaka et al. | 370/94.1 |
| 4,897,841 | 1/1990 | Gang, Jr. | 370/85.13 |

*Primary Examiner*—Douglas W. Olms
*Assistant Examiner*—Dang Ton
*Attorney, Agent, or Firm*—Douglas J. Kirk; John J. Torrente

[57] ABSTRACT

An apparatus and method for recognizing destination addresses in information packets wherein a recognition that a destination address corresponds to a source address is made based upon a first match decision in which fragments of the destination address are compared with representations of corresponding fragments of source addresses and a second match decision in which fragments of a scrambled version of the destination address are compared with representations of corresponding fragments of similarly scrambled versions of the source addresses.

34 Claims, 16 Drawing Sheets

FIG. 6A

APPARATUS AND METHOD FOR RECOGNIZING ADDRESSES OF INFORMATION PACKETS

BACKGROUND OF THE INVENTION

This invention relates to an apparatus and method for recognizing information addresses and, in particular, to an apparatus and method of this type for use with networks which carry information.

It is common practice in today's technology to connect multiple stations together to form a network. The advantage of a network is that the information and capabilities of each station on the network can be accessed and shared with the other stations on the network. A network which operates locally is typically referred to as a Local Area Network (LAN).

Individual LANs are generally limited in the number of stations that can be interconnected. In a typical LAN 20-100 stations is the practical limit. However, with the significant acceptance and use of LANs, there has come an increased demand to build networks accommodating a larger number of stations (e.g., 4000-8000). This has been achieved by interconnecting individual LANs using so-called "bridges".

A bridge examines packets of information on a LAN and determines whether or not each packet needs to be forwarded to another attached LAN. The basic mechanism employed by a bridge to make these "filter/forward decisions" makes use of source and destination addresses carried by each information packet.

Using these addresses a bridge carries out a recognition procedure in which it compares the destination address of a received information packet with a database having the source addresses of all the stations located on the same LAN from which the bridge received the packet. If the destination address is contained in the source address database, the packet is destined for the same LAN and, as a result, the packet is filtered (not forwarded to the other attached LAN) by the bridge. If the destination address is not contained in the source address database, the packet is then forwarded by the bridge to the other LAN. The bridge also examines the source address of each information packet to see whether it has been previously stored in the database associated with the transmitting LAN. If it has not, the address is then stored so that the next time the same destination address appears, the bridge will find it in the database and filter the information.

To facilitate highspeed data throughput, a bridge must make a filter/forward decision and, thus, carry out the address recognition procedure in as short an amount of time as possible. One recognition technique employed in existing bridges which enables such rapid recognition makes use of a Content Addressable Memory (CAM). The high speed recognition of a CAM is accomplished by hardware that processes the comparison of each destination address with stored source addresses in parallel. Such implementation of the CAM, however, makes the CAM expensive and also severely limits its storage capability. As an illustration, CAMs that are commonly available are capable of storing 256 addresses corresponding to approximately 1200 bits of information. This compares with a Random Access Memory (RAM) that can today be obtained in the 1 Megabit range.

A second technique for implementing address recognition in existing bridges relies on the use of a RAM to store source addresses. The destination address of a received packet is then successively compared with each source address in the memory until a match is found or the memory exhausted. RAM storage offers the advantage that a very large number of source addresses can be economically stored. However, the time required to find a match is slow as compared to the CAM technique previously discussed.

To increase the speed of recognition when RAM storage is used, a hashing process may be added. Hashing requires a "hash" function that maps addresses into integers in the range 0 to $k-1$. Any hashing function of the source address that gives a uniform distribution of hash values will do. Source addresses are stored in a RAM table consisting of K "buckets" numbered 0 to $k-1$. All source addresses that map to the same integer value are stored in the same "bucket". While hashing increases speed, the implementation of hashing techniques in hardware is very difficult and costly.

It is therefore an object of the present invention to provide an improved apparatus and method for recognizing addresses.

It is a further object of the present invention to provide an apparatus and method for recognizing source addresses of information packets in rapid fashion for large numbers of addresses.

It is a further object of the present invention to provide an apparatus and method as recited in the preceding objectives and which can be inexpensively implemented with hardware.

It is yet a further object of the present invention to provide an apparatus and method as recited in the preceding objectives and which is implemented in a bridge for connecting LANs.

SUMMARY OF THE INVENTION

In accordance with the principles of the present invention, the above and other objectives are realized in a recognition apparatus and method in which at least first and second match determinations are made in order to reach a recognition decision. In making the first match determination, the address parts of a destination address of a received packet are first segmented into first fragments each containing different address parts. Each first fragment is then assessed to determine whether it corresponds to any one of first stored representations of associated fragments of source addresses. If all the first segments are found to have corresponding first stored representations, a first match determination is made.

The second match determination is made in a similar manner except it is based on a scrambled form of the received destination address and on stored representations of scrambled forms of the source addresses. More particularly, the received address is scrambled and fragmented into second fragments each containing different address parts of the scrambled destination address and at least one of which is different from the first fragments. The second fragments are then also assessed to determine whether each corresponds to any one of second stored representations of associated fragments of the scrambled source addresses. If all the second segments are found to have corresponding second representations, a second match determination is made. Once both first and second match determinations are made, a recognition is made that the destination address is one of the source addresses.

The apparatus and method of the invention can be further extended to require additional match determinations be made before a recognition is reached. These further match determinations can be carried out similarly to the second match determination, except that each further match determination will be based upon a different scrambling of the destination addresses and upon representations of the source addresses which are correspondingly differently scrambled.

In the embodiment of the invention to be disclosed hereinafter, each fragment of a source address associated with a given fragment of a destination address contains source address parts from the same locations and in the same sequence of locations as the address parts of the destination address fragment. Furthermore, there is like scrambling of the destination address and the source addresses used in making each given match determination.

Also, in the disclosed embodiment of the apparatus and method, representations of the source addresses and scrambled source addresses are constructed from the source addresses of the received information packets. The embodiment is further .1 disclosed as incorporated in a bridge connecting LANs and as comprised of hardware.

BRIEF DESCRIPTION OF THE DRAWINGS

The above and other features and aspects of the present invention will become more apparent upon reading the following detailed description in conjunction with the accompanying drawings, in which:

FIG. 6A is a table illustrating the operation of the recognition apparatus of FIG. 6;

DETAILED DESCRIPTION

Figure 1:
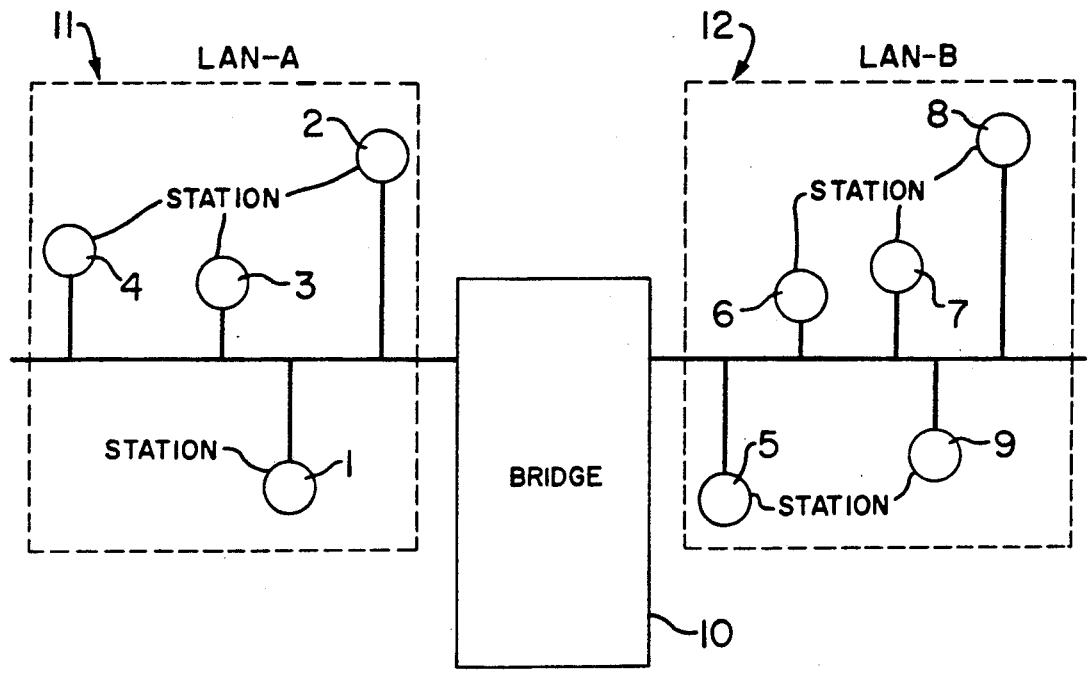
FIG. 1 shows a bridge connecting two LANs and using a recognition apparatus in accordance with the principles of the present invention.

In FIG. 1, two local area networks LAN-A 11 and LAN-B 12 are connected by a bridge 10. In the case shown, LAN-A 11 includes four stations 1-4 and LAN-B includes five stations 5-9. The stations connected to LAN-A and LAN-B, respectively, may communicate among themselves over their respective LANs without requiring t e assistance of the bridge 10. For communications from LAN-A to LAN-B, the bridge 10 must receive and forward the information.

Figure 2:
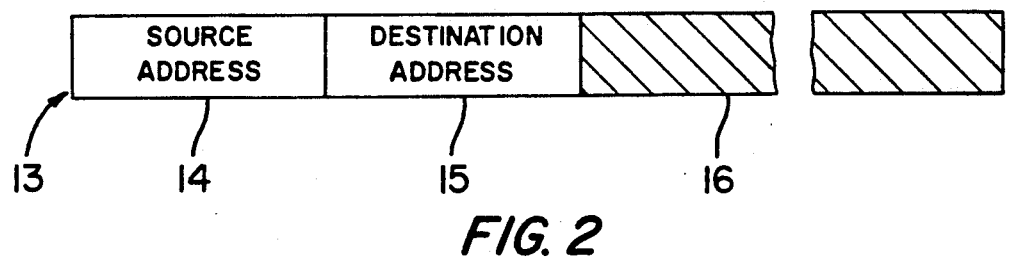
FIG. 2 shows a message packet transmitted by the stations on the LANs of FIG. 1.

FIG. 2 represents a communications packet 13 as transmitted by each of the stations 1-9 on its respective LAN. The packet 13 contains a source address 14 indicating which station 1-9 initiated the transmission and a destination address 15 indicating to which of the stations 1-9 the information is destined. The data to be passed from the source station to the destination station is contained in data group 16.

Figure 3:
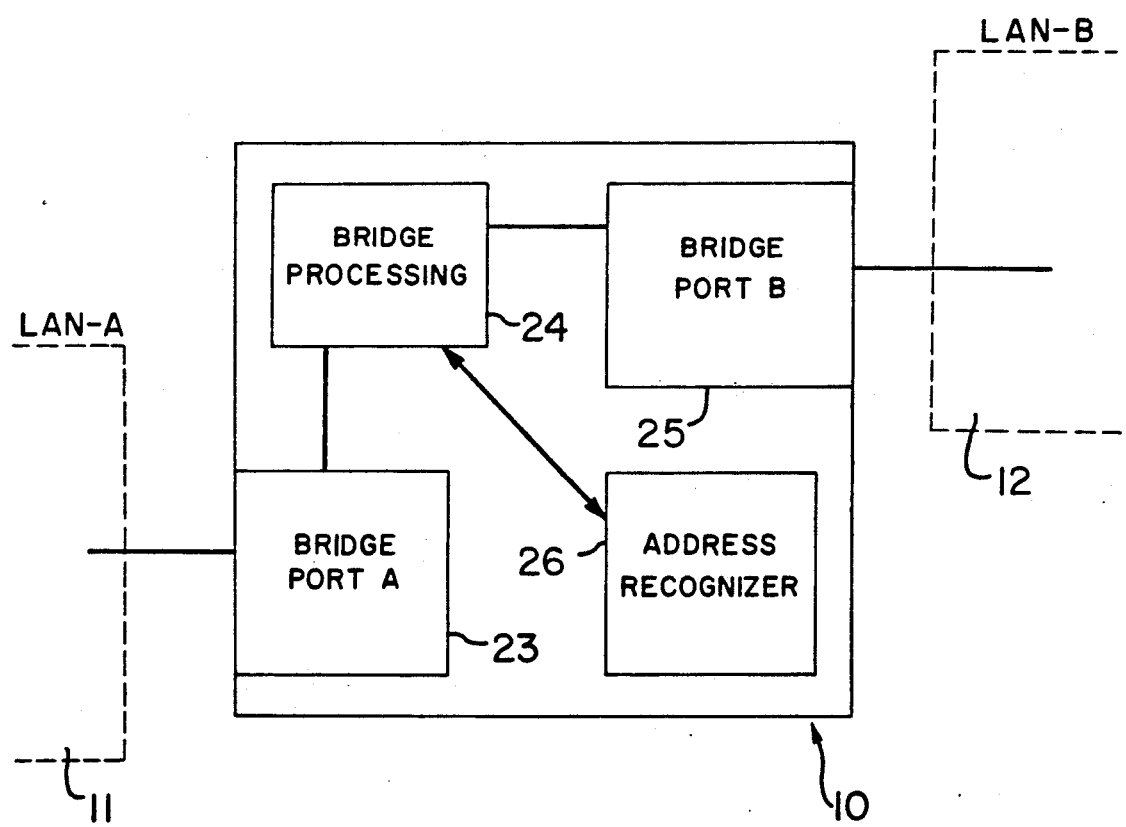
FIG. 3 illustrates the bridge of FIG. 1 in greater detail.

In FIG. 3, the bridge 10 is shown in greater detail. As illustrated, the bridge includes bridge port-A 23 and bridge port-B 25 which connect the bridge to the LAN-A 11 and LAN-B 12, respectively. Port-A 23 and port-B 25 are connected together through a bridge processing section 24. The bridge processing section 24 is connected to an address recognizer 26 which, as will be discussed below, is implemented in accordance with the principles of the present invention.

The address recognizer 26 stores source addresses and subsequently makes a recognition decision as to whether a destination address of a received information packet is the same as a stored source address. Depending upon the result of the recognition decision, the bridge 10 then either forwards the packet to the other LAN or filters the packet.

Figure 4:
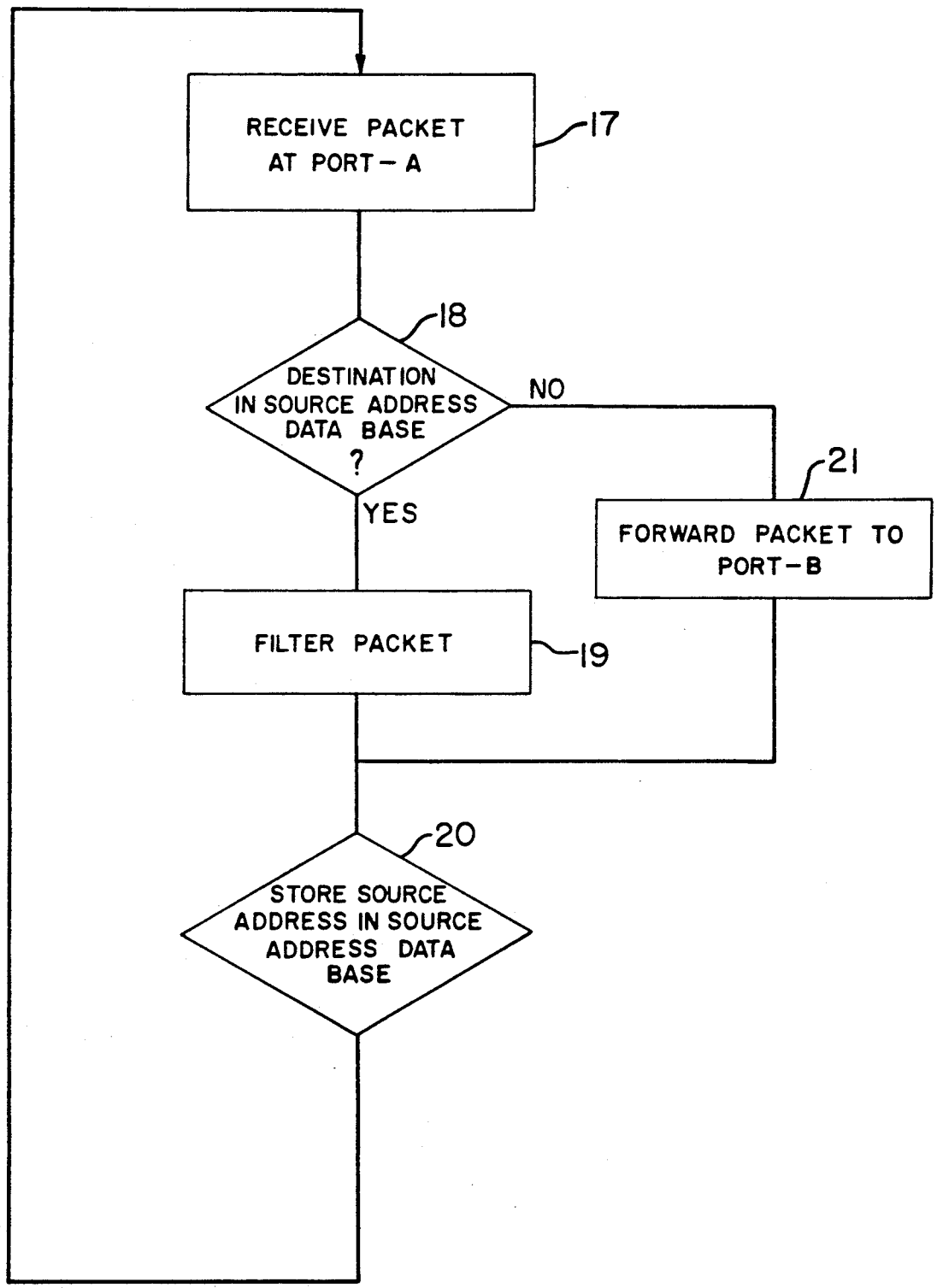
FIG. 4 is a flow chart of the operations within the bridge of FIG. 3.

The flow chart of FIG. 4 sets forth the operations required of the bridge elements 23-25 in making the aforementioned filter/forward decision. In Step 17,—RECEIVE PACKET AT PORT-A —, a packet 13 transmitted by a station 1-4 located in LAN-A 11 is received at port-A 23 of the bridge. In step 18, —RECOGNITION OF DESTINATION ADDRESS IN SOURCE ADDRESS DATABASE?—, the recognizer 26 tests its source address database to determine whether the destination address 15 in the packet 13 is contained therein for the bridge port A. If the result is NO, progress is made to step 21. In step 21,—FORWARD PACKET TO PORT-B—, packet 13 is placed on bridge port-B 25 and progress is made to step 20. If the answer to step 18 is YES, progress is made to step 19. In step 19, —FILTER PACKET—, it has been determined in step 18 by the recognizer that the packet 13 has a destination address that is a source address for the port-A 23 and, hence, that it is destined for a station located on the corresponding LAN-A 11 on which the packet was transmitted. The packet therefore is filtered (not forwarded to LAN-B 12) and progress is made to step 20.

In step 20,—STORE SOURCE ADDRESS IN SOURCE ADDRESS DATABASE—, the source address 14 is stored in the source address database of the recognizer 26 as a source address for the port-A 23. As a result, the next time a packet 13 is received from the port-A 23 with this source address as a destination address, the bridge 10, via the recognizer 26, will recognize that the destination is on the LAN-A 11 and thus will filter the packet. Progress is then made to step 17 where bridge 10 is again set to receive the next packet 13.

Figure 5:
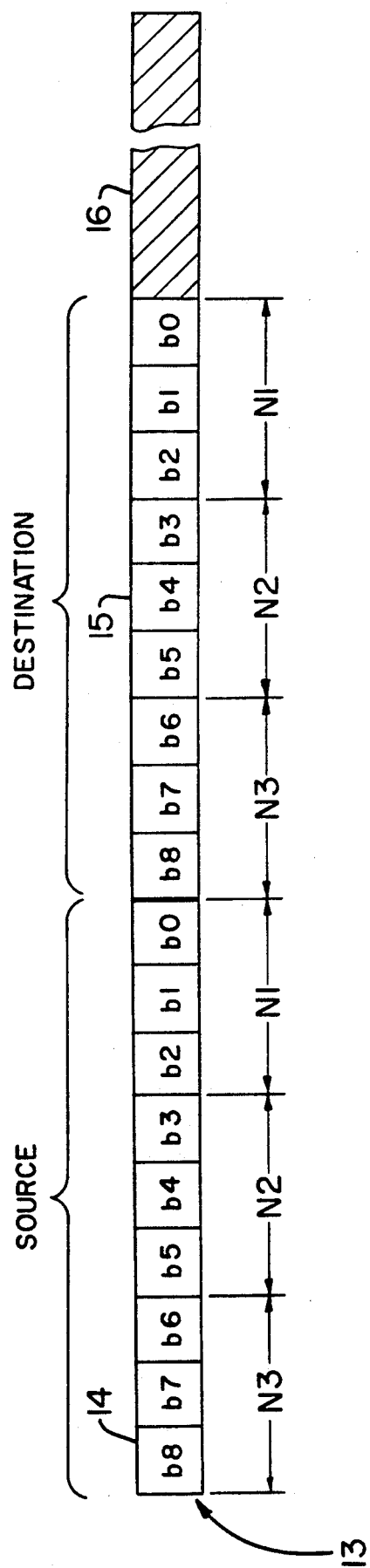
FIG. 5 illustrates the message packet of FIG. 2 in greater detail.
Figure 6:
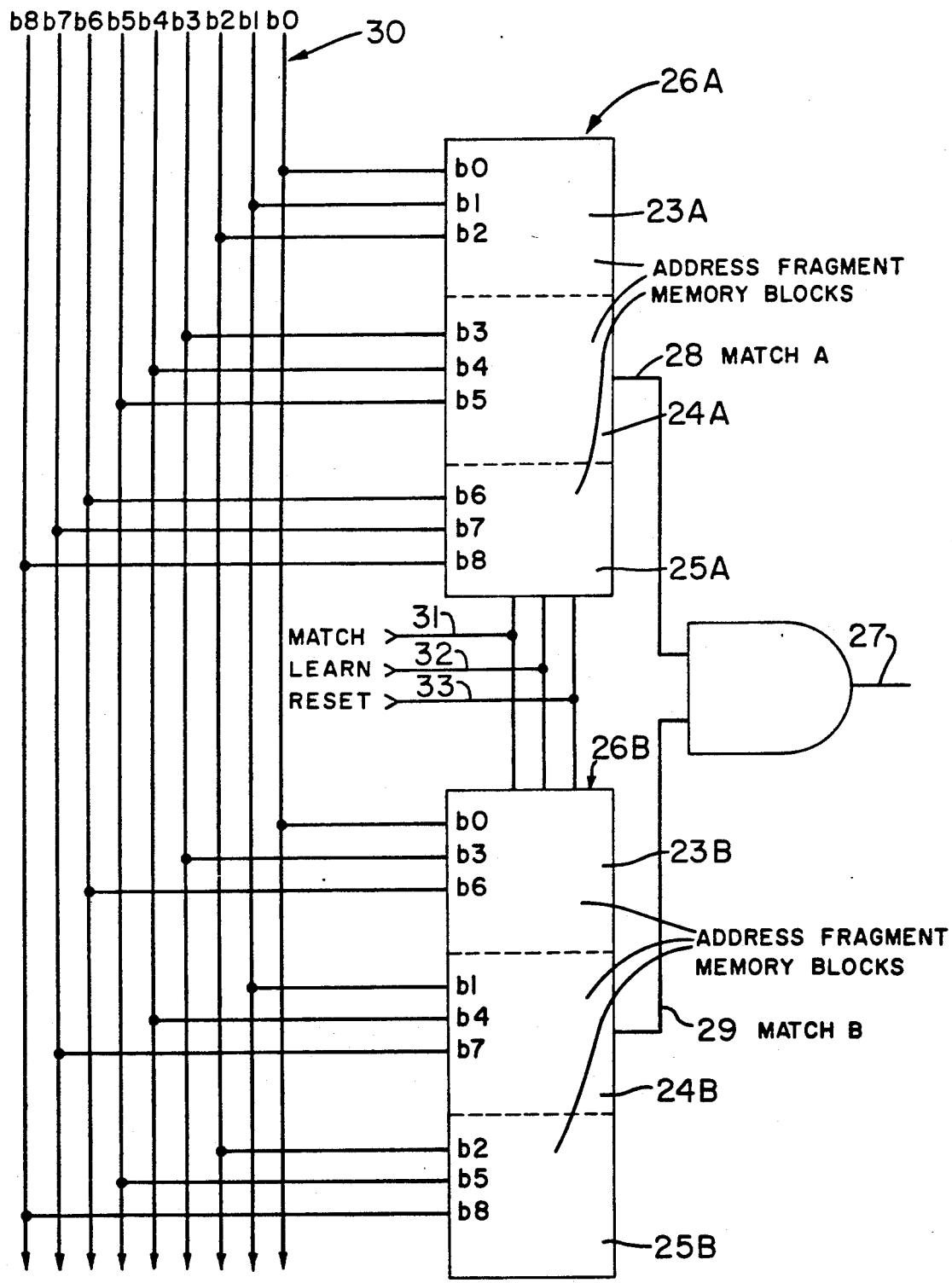
FIG. 6 illustrates a hardware implementation of the address recognition apparatus of the invention shown in FIG. 3.

FIG. 6 is a hardware implementation of the recognizer 26 of FIG. 3 adapted in accordance with the principles of the present invention. The recognizer of FIG. 6 will be discussed in connection with the more detailed illustration of the packet 13 of FIG. 2 shown in FIG. 5. As shown in FIG. 5, source address 14 and destination address 15 of the packet 13 are each comprised of 9 address parts or bits labeled B0-B8. These bits are segmented into three fragments N1—N3, each fragment comprised of a sequence of 3 bits. Thus, fragment N1 contains bits B0-B2, fragment N2 bits B3-B5, and fragment N3 bits B6-B8. With the 9 bit scheme, the source or destination addresses can be in the range of 000-777 (octo decimal).

Referring now to FIG. 6, the recognizer 26 comprises an address memory block-A 26A which operates to make a match decision with respect to a destination address of a received information packet by comparing the address with representations of corresponding source addresses associated therewith, i.e., source addresses whose stations are on the same LAN from which the packet was received. Address lines 30 couple the address bits segmented into address fragments to address fragment memory blocks 23A-25A, with the address fragment N! comprised of bits B0-B2 being coupled to the first fragment memory 23A, the address fragment N2 comprised of bits B3-B5 to the second fragment memory 24A and the address fragment N3 comprised of bits B6-B8 to the third fragment memory 25A. A reset input 33 clears address memory block-A 26A when enabled.

With the bits of a source address 14 present on the address lines 30, the learn input 32 is enabled, causing the fragment memory blocks 23A-25A to record and store representations of the source address fragments N1 to N3 being coupled thereto. With the bits of the destination address 15 on the address lines 30, on the other hand, the match input 31 is enabled. This causes the fragment memory blocks 23A-25A to compare the respective fragments of the destination address being coupled to the blocks with the previously stored representations of associated source address fragments. Thus, the fragment N1 of the destination address is compared with previously stored representations of source address fragments N1, the fragment N2 with previously stored representations of source address fragments N2 and the fragment N3 with previously stored representations of source address fragments N3. If each comparison results in a match of a destination address fragment with a stored representation, the match A output 28 of address memory block 26 is enabled, indicating a match decision has been made by the block.

As an example of the above, assume memory block-A 26A is initially reset by momentarily enabling reset line 32. When a source address 14 of "4 5 6" (i., e., N1: 110; N2: 101; N3: 100) is present on the address lines 30 and the learn input 32 enabled, the address fragment memory blocks 25A-23A will record representations of "4", "5" and "6", respectively. When a new source address 14 of "4 6 7" (i.e., N1: 111; N2: 110; N3: 100) is present on the address lines 30 and the learn input is enabled 32, the address fragment memory block 25A-23A will now record representations of "4", "6" and "7", respectively.

When new address fragments presented to an address fragment memory block 23A-25A are the same as a previously presented fragment, the previously recorded representation will also serve as the representation for the newly presented fragments. Thus, in the case of the destination address "467", since the fragment memory block 25A already has recorded the representation of a "4" from the previous source address "456", it will recognize this and use the representation for the previously presented "4" also as the representation for the second presented "4".

If a destination address of "4 5 6" or "4 6 7" is now present on the address lines 30 and the match input 31 is enabled, each of the address fragment memory blocks 23A to 25A will now have a stored source address fragment representation which matches its applied destination address fragment and thus the match-A output 28 of the block 26A will be enabled thereby indicating a MATCH. In each case, the MATCH is a TRUE MATCH, since the destination address actually corresponds to a previously stored source address.

However, if a destination address of "4 5 7" or "4 6 6" is present on the address lines 30 and the match input 31 is enabled, the match-A output 28 will likewise be enabled, since each fragment memory block 23A to 25A will again contain a source address fragment representation which matches its applied destination address fragment. In both cases, however, the MATCH is a FALSE MATCH, since neither address "4 5 7" or "4 6 6" corresponds to the actual addresses "4 5 6" and "4 6 7". This FALSE MATCH condition results from the fact that the second address fragment memory 24A stored source address fragment representations of both a "5" and a "6" and therefore responds positively to either when testing for a match. Similarly, the first address fragment memory 23A stored source address fragment representations of both a "6" and "7" and thus responds positively to either when testing for a match.

In order to minimize the number of FALSE MATCHES for the recognizer 26, the recognizer is provided with a second address memory block-B 26B. The memory block-B 26B also makes a match determination for each destination address and only when both memory blocks 26A and 26B make a match determination is a recognition decision reached.

In the illustrative case, second address memory block-B 26B is functionally identical to first address memory block-A 26A, except that the addresses being applied to the second memory block are scrambled versions of the addresses being applied to first memory block 26A. As shown, this scrambling is accomplished simply by rearranging the connection of the address bits B0-B8 are scrambled to cause address fragments N1, N2 and N3 to now comprise bit sequences B0 B3 B6, B1 B4 B7, and B2 B5 B8, respectively. As a result, address fragment memory blocks 23B-25B now receive scrambled source and destination address fragments which are different than the address fragments received by the blocks 23A-25B.

Other than operating on the scrambled address fragments, the blocks 23B-25B function similarly to the blocks 23A-25A in storing representations of scrambled source address fragments and in comparing like scrambled destination address fragments with corresponding stored representations to make a match decision. In this case, however, when a match is found by all three blocks 23B-25B, the match-B output 29 is enabled. As above-indicated and shown in FIG. 6, only when both match-A output 28 and match-B output 29 are enabled is the recognition output 27 enabled and a recognition decision made.

Figure 6A:
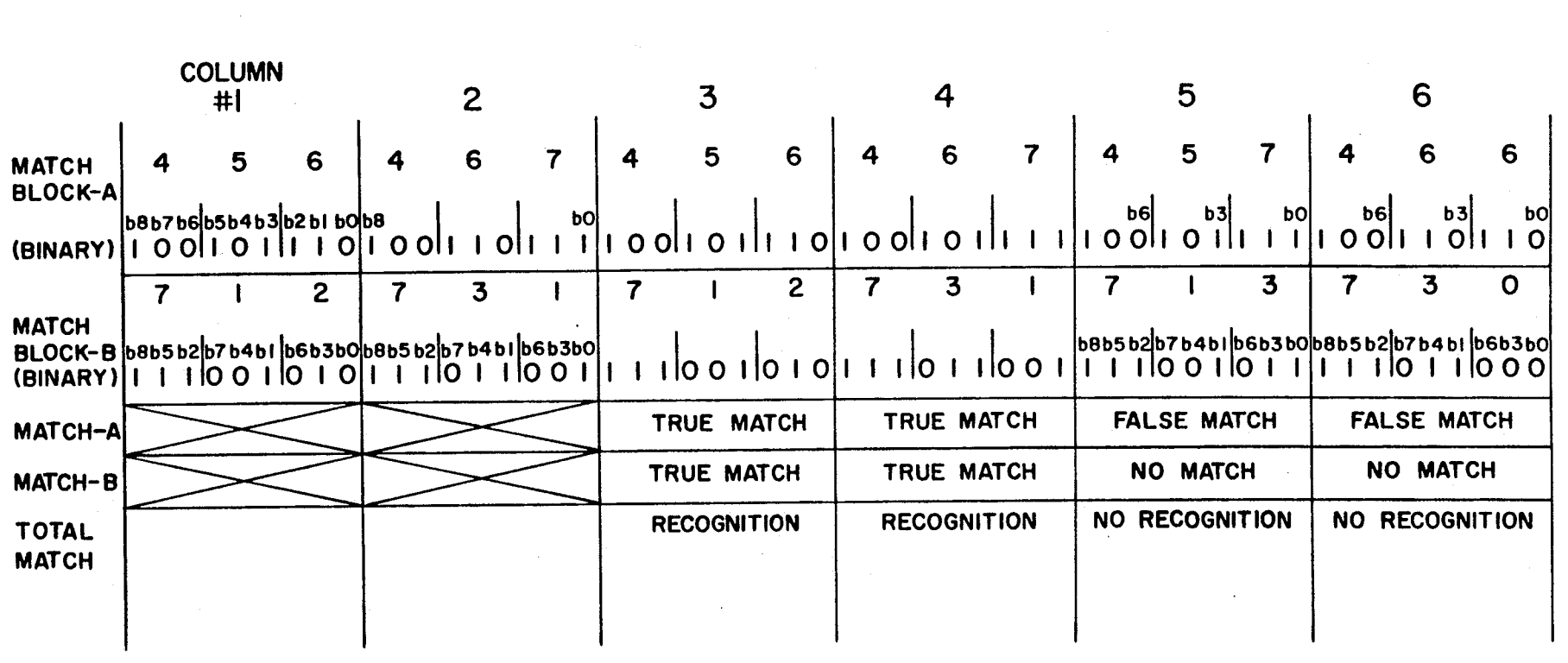

Table 1, shown in FIG. 6A, demonstrates the effectiveness of using the combination of address memory blocks 26A and 26B, in reducing FALSE MATCHES. Column 1 in Table I shows the binary and octal representation of a first source address of "4 5 6" present on the address lines 30. Address fragment memory blocks-A 25A-23A respond thereto by storing representations of "4 5 6", respectively. As a result of the scrambling, fragment memory blocks-B 25B-23B, in turn, respond by storing representations, of scrambled fragments "7 1 2", respectively. Similarly, in column 2, when the source address "4 6 7" is present on the address lines 30, address fragment memory blocks-A 25A-23A store representations of "4 6 7" and by virtue of the scrambling, memory blocks-B 25B-23B store representations of "7 3 1", respectively.

In column 3, destination address "4 5 6" is matched against the stored representations in address fragment memory blocks-A 25A-23A and scrambled destination address "7 1 2" is matched against the stored representations in address fragment memory blocks-B 25B-23B. The result is that both the match-A output 28 and match-B output 29 are enabled, causing the output 27 to be enabled and result in a RECOGNITION. Column 4 is similar to column 3 except that destination address "4 6 7" is compared. The output results are the same as column 3, with a RECOGNITION being reached.

In column 5, a destination address of "4 5 7" is matched against the stored representations in address fragment memory blocks-A 25A-23A and the scrambled destination address "7 1 3" is matched against the stored representations in address fragment memory blocks-B 25B-23B. As a result, the match-A output is enabled (a FALSE MATCH because a "4 5 7" source address was never received or learned). This FALSE MATCH resulted because the second address fragment memory block-A 24A has stored representations of both a "5" and "6" and the first address fragment memory block-A 23A has stored representations of both a "6" and "7". However, the scrambled destination address "7 1 3", when matched against the representations in the address fragment memory blocks-B 25B-23B, results in the match output-B being disabled (the first address fragment memory block-B 23B has stored representations of a "1" and "2" but not a "3"). Therefore, the match-B output 29 is disabled indicating NO MATCH and the output 27 is also properly disabled, indicating NO RECOGNITION. Column 6, in a manner similar to column 5, properly results in a disabled output 27 indicating NO RECOGNITION when a destination address "4 6 6" is received.

It should be noted that, while the scrambling of the addresses for application to the address memory block-B 26B may take on a variety of forms, it should be such that at least one scrambled fragment of a scrambled address is different from the fragments of the address in unscrambled condition. Also, like scrambling should be used for both source addresses and destination addresses. Similarly, corresponding address fragments (e.g., all N1s), either scrambled or unscrambled, should be applied to the same address fragment memory block.

Figure 7:
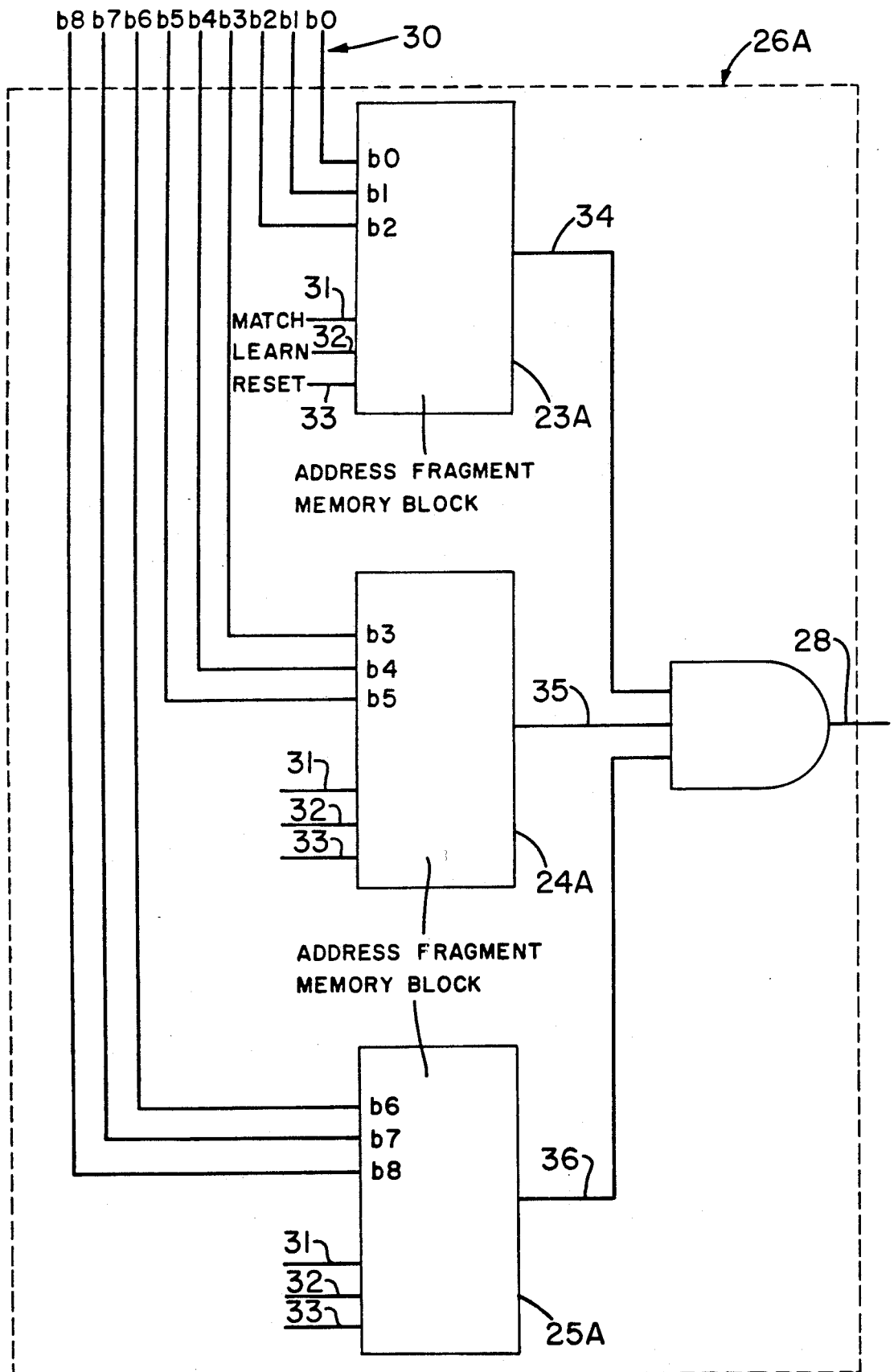
FIG. 7 illustrates an address memory block of the recognition apparatus of FIG. 6 in greater detail.

In FIG. 7, the address memory block 26A of FIG. 6 is shown in more detail. The address fragment memory blocks 23A-25A have status outputs 34-36, respectively. While the match input 31 is enabled, each status output 34-36 is enabled if the corresponding destination address fragment present on the respective lines 30 matches a representation of a source address fragment previously recorded or stored in the respective address fragment memory block. The status outputs 34-36 connect through an AND gate 37 to the match-A output 28. When all the status outputs 34-36 are enabled, the match-A 28 output is enabled.

Figure 8:
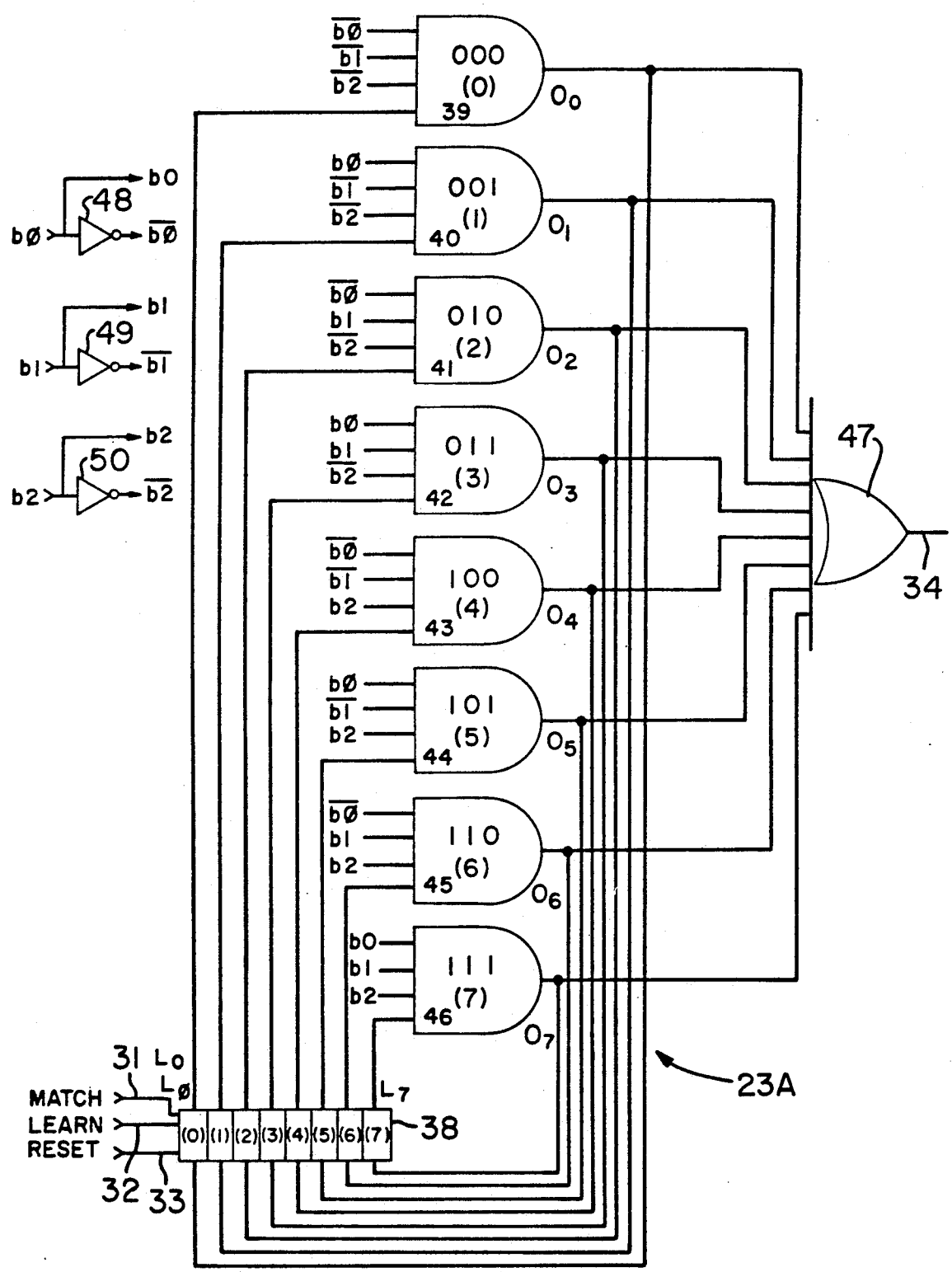
FIG. 8 shows an electrical logic circuit diagram of an address fragment memory block of the address memory block shown in FIG. 7.

In FIG. 8, an embodiment of the address fragment memory block 23A of FIG. 7 is shown in more detail. Three bits B0-B2 of the address are connected to inverters 48-50 respectively forming inverted bits B0'-B2'. Eight QUAD INPUT AND gates 39-46 have their outputs connected to the input of an OR gate 47 and also connected to an 8 stage input latch 38. The output of the OR gate 47 is status output 34. Each one of the latch 38 outputs connects to an input of one of the QUAD INPUT AND gates 39-46. The address lines B0-B2 and B0'-B2' are connected to the remaining three inputs of the QUAD INPUT AND gates 39-46 so that the outputs of the respective AND gates 39-46 are enabled when the address fragments B0-B2 are 0-7, respectively. Match input 31, learn input 32 and reset input 33 connect to the latch 38. When the match input 31 is enabled, the latch 38 contents which are stored representations, based on bit position, of received source address fragments B0-B2, are placed on the latch 38 outputs. When the learn input 32 is enabled, the latch 38 outputs all are enabled.

Figure 9:
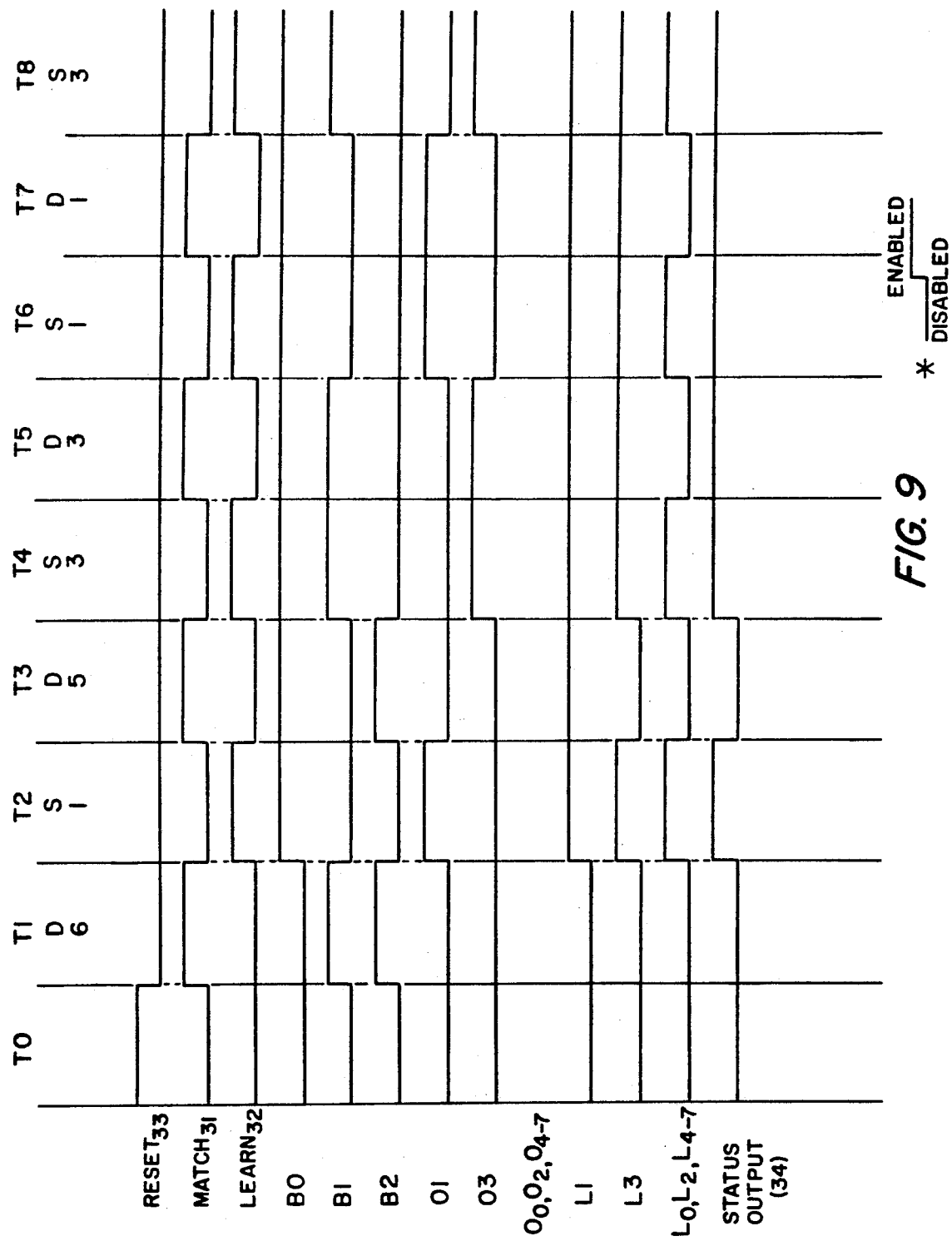
FIG. 9 is a waveform diagram showing the waveforms at different prints of the circuit in FIG. 8.

FIG. 9 shows waveform diagrams of the signals at different points in the address fragment memory block 23A of FIG. 8. The latch 38 outputs are represented by L0-L7, respectively. The outputs of the QUAD INPUT AND gates 39-46 are represented by 00-07, respectively. Nine time intervals T0-T9 are shown. At T0, the reset line 33 is enabled so as to clear all the latch outputs L0-L7. At time intervals T1, T3, T5, and T7 a destination address fragment is compared against the stored representations of source address fragments in latch 38 to determine whether that fragment address was previously received and stored. At time intervals T2, T4, T6, and T8 a representation of a source address fragment is stored in the latch.

At T1, a destination address fragment "6" is present on address lines B0-B2 (B2=1, B1=1, B0=0). The match input 31 is enabled thereby causing the values stored in the latch 38 to be placed on L0-L7. However, since the latch was previously cleared (at time T0), L0-L7 all are disabled. Therefore, the outputs 00-07 of AND gates 39-46 are all disabled. The status output 34 is disabled.

At T2, a source address fragment "1" is present on address lines B0-B2 (B2=0, B1=0, B0=1). The match line 31 is disabled. The learn line 32 is enabled, thereby resulting in L0-L7 being enabled. The output of the AND gate that represents the value "1" (AND gate 40) is thus enabled, causing the latch 38 element or position corresponding to the value "1" to be enabled.

At T3, a destination address fragment of "5" is present on address lines B0-B2 (B2=1 B1=0, B0=1). The match input 31 is enabled thereby causing the representations stored in the latch 38 to be placed on L0-L7. Since the latch 38 element corresponding to the address fragment "1" was previously recorded (at time T2), L1 is enabled. However, the destination address fragment "5" does not match the "1" fragment previously stored. Therefore, the outputs 00-07 of AND gates 39-46 are all disabled. The status output 34 is disabled.

At T4, T6 and T8, source address fragments "3", "1" and "3" are recorded in the same manner described for T2.

At T5, a destination address fragment "3" is present on address lines B0-B2 (B2=0, B1=1, B0=1). The match input 31 is enabled thereby causing the representations stored in the latch 38 to be placed on L0-L7. Since the latch 38 element corresponding to the address fragments "1" and "3h" were previously recorded (at time T2 and T4), L1 and L3 are enabled. The destination address fragment "3" does match the "3" AND gate 42 corresponding to a value of "3") is enabled. The status output 34 is therefore enabled.

At T7, a destination address of "1" is present on address lines B0-B2 (B2=0, B1=0 B0=1). The match input 31 is enabled thereby causing the representations stored in the latch 38 to be placed on L0-L7. Since the latch 38 element corresponding to the fragments "1" and "3" were previously recorded (at time T2, T4 and T6), L1 and L3 are enabled. The destination address fragment "1" does match the "1" fragment previously recorded. Therefore, 01 (the output of the AND gate 40 corresponding to a value of "1") is enabled. The status output 34 is therefore enabled.

As above mentioned, the implementation of the recognizer 26 shown in FIGS. 6-8 is based upon the use of source and destination addresses comprised of nine bits. It is also based upon the use of only two matches, one of which uses scrambled addresses, to make a recognition decision. However, the principles of the invention can be easily extended to addresses containing a larger or smaller number of bits or addresses segmented into a larger or smaller number of segments merely by increasing or decreasing the memory capacities of the disclosed memory elements or by adding like elements or removing some of the existing elements. Furthermore, additional matches can be required before a recognition decision is reached by further scrambling of the source and destination addresses and by extending the recognizer to include additional memory blocks like blocks 26A and 26B to perform the match operation for the additionally scrambled addresses.

Figure 10:
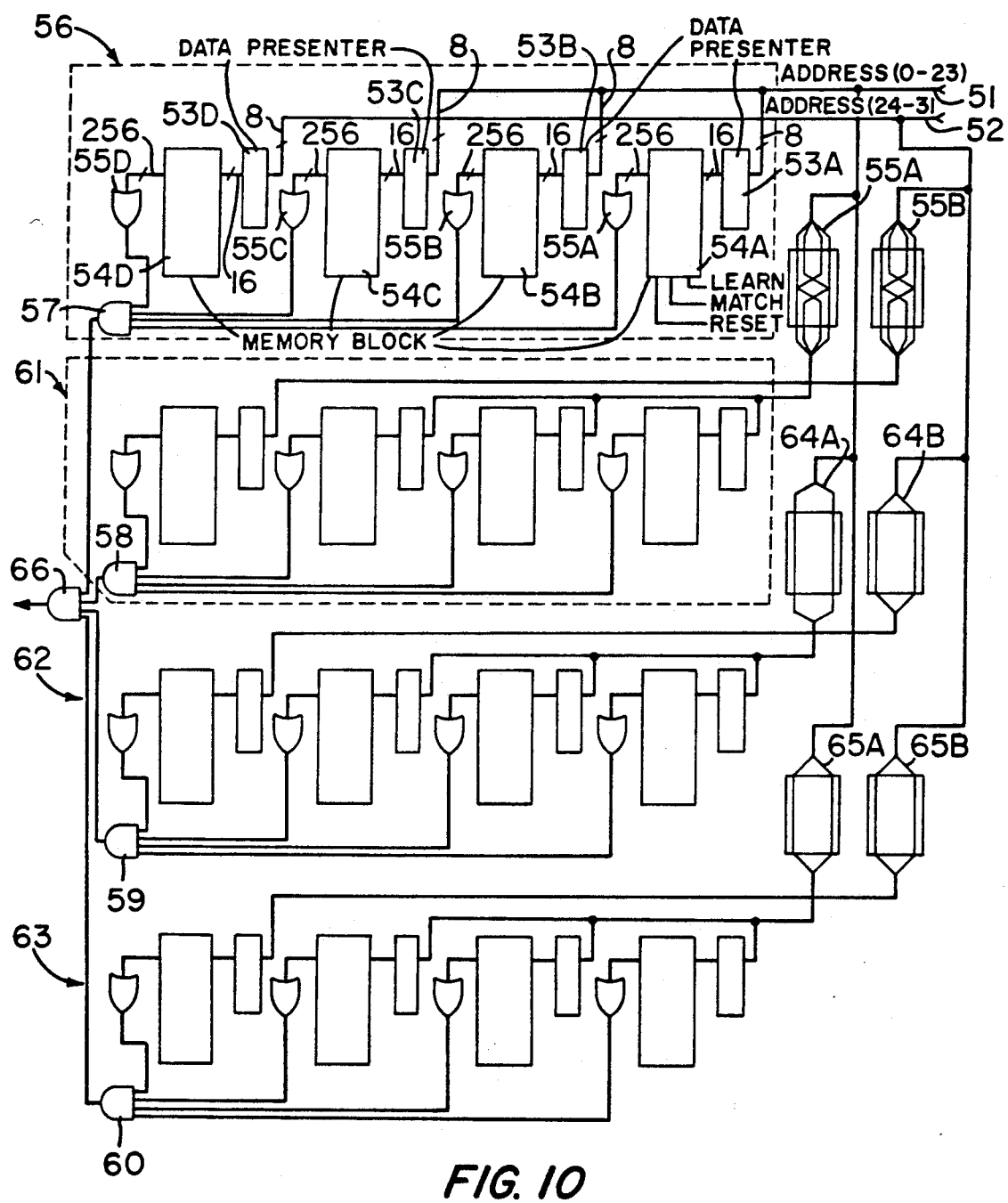
FIG. 10 illustrates a hardware implementation of the recognition apparatus of FIG. 3 expanded to accommodate thirty-two bit addresses.

FIG. 10 shows such a modification of the recognizer 26. Specifically in FIG. 10 recognizer 26 has been enlarged to support addresses comprised of 32 bits and organized into address fragments of 8 bits each. Furthermore, the recognizer has been modified to require two additional matches of further scrambled addresses before a recognition is reached. As shown, this scrambling has been achieved similarly to the scrambling in FIG. 6 by rearranging the connection of the address lines 30 to the additional address memory blocks.

More particularly, in a first address memory block 56 the twenty-four LSBs 51 (least significant bits) of a received address connect to data presenters 53A-53C, bits 0-7 forming a first address fragment connecting to data presenter 53A, bits 8-15 forming a second address fragment connecting to data presenter 53B and bits 16-23 forming a third address fragment connecting to data presenter 53C. The eight MSBs 52 (most significant bits) of the address forming a fourth address fragment connect to data presenter 54D.

Each data presenter has an output consisting of sixteen bits, the first eight being a copy of the eight address bits at their input and the second eight being an inverted copy thereof. The outputs of data presenters 53A-53D connect to the When source addresses are present on the address lines 51, 52, each address fragment memory block 54A-54D records representations of the eight bit address fragment (8 bits=256 combinations) present at its input. Subsequent destination address fragments are compared with the recorded representations to determine whether a match exists in a similar manner as discussed above with respect to FIGS. 6-9.

Each memory block 54A-54D has 256 outputs, each output corresponding to one of the possible source address fragments. A given output is enabled when a match between a destination address fragment and a previously recorded representation of a source address fragment is found. The outputs of memory blocks 54A-54D connect respectively to OR gates 55A-55D. The output of each OR gate 55A-55D connects to the input of AND gate 57. Only when all memory blocks 54A-54D detect a match between a destination address fragment and a stored representation of a source address fragment is the output to the AND gate 57 enabled, thereby resulting in a match by the memory block 56.

Additional match determinations are simultaneously made in parallel based upon differently scrambled addresses in address memory blocks 61-63. Only when these memory blocks and the memory block 56 all make match decisions is a recognition reached. More particularly, the address lines 51, 52 are scrambled by a first scrambling means 55A, 55B. The latter scrambling means may be formed by rerouting the copper on a printed circuit board (not shown) or by logic components (not shown). The scrambled addresses from scrambling means 55A, 55B are then introduced into block 61 which operates in a similar manner as block 56 to compare scrambled destination address fragments with representations of scrambled source address fragments to make a match decision. If a match is found, the output of AND gate 58 is enabled.

The address lines 51, 52 are further scrambled in second 64A, 64B and a third 65A, 65B scrambling means which connect to blocks 62 and 63, respectively. Blocks 62 and 63 function similarly to the block 61, except with different scrambled addresses. When a match is found in each of these blocks, AND gates 59 and 60 are enabled. In the event, AND gates 57, 58, 59, and 60 are all enabled, AND gate 66 is enabled, thereby resulting in a recognition decision.

Figure 11A:
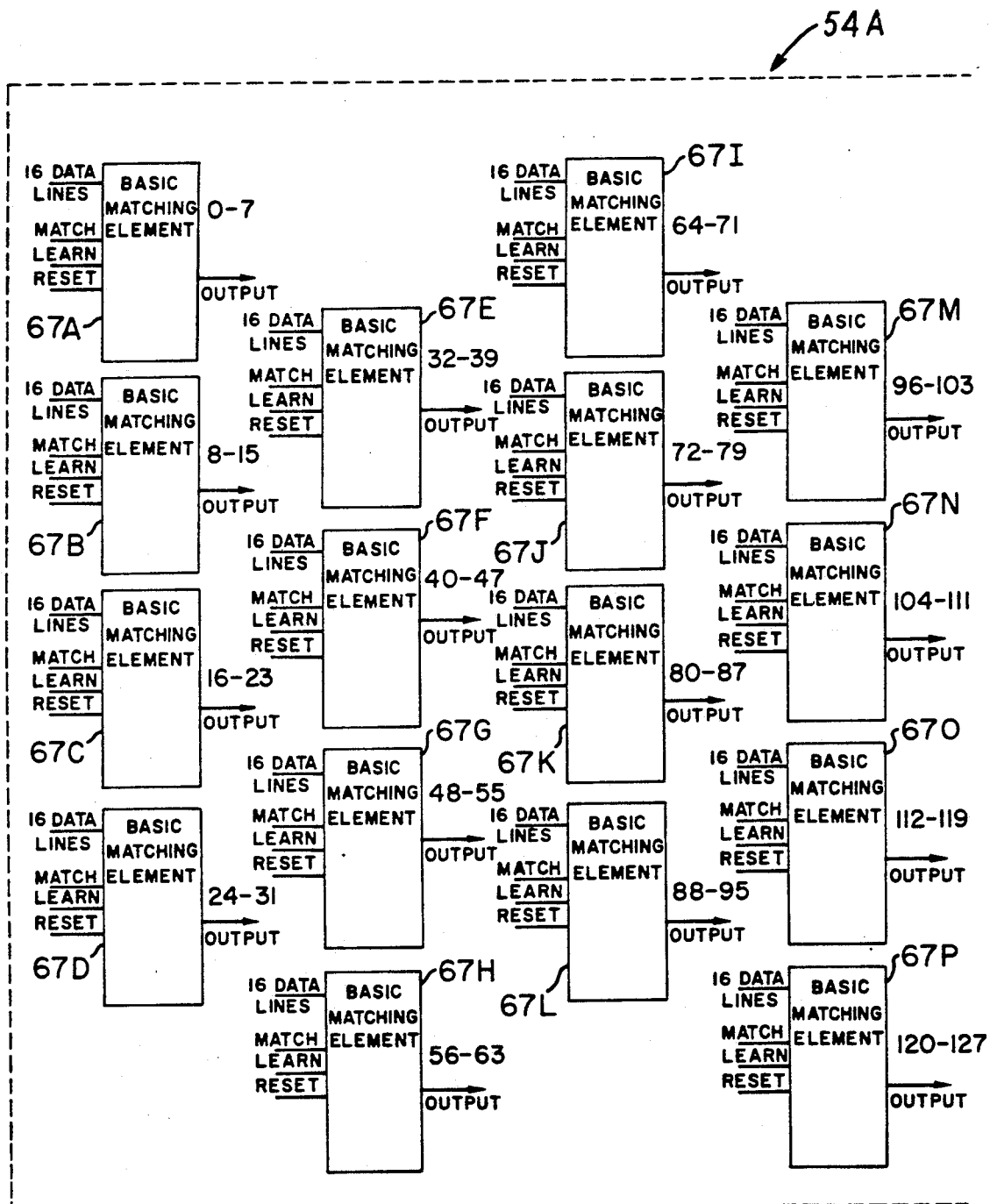
FIGS. 11A and 11B illustrate the address fragment memory blocks of the address recognition apparatus of FIG. 10 in greater detail.

In FIG. 11A, an implementation of memory block 54A is shown. Memory block 54A comprises thirty two basic matching elements 67A-67FF, each having 8 outputs. The outputs of the first basic matching element 67A correspond to representations 0-7 of the 8 bit address segment. Each successive basic matching element corresponds to the next block of eight representations of the segment. The last basic matching element 67FF corresponds to representations 248-255 of the segment.

Figure 11B:
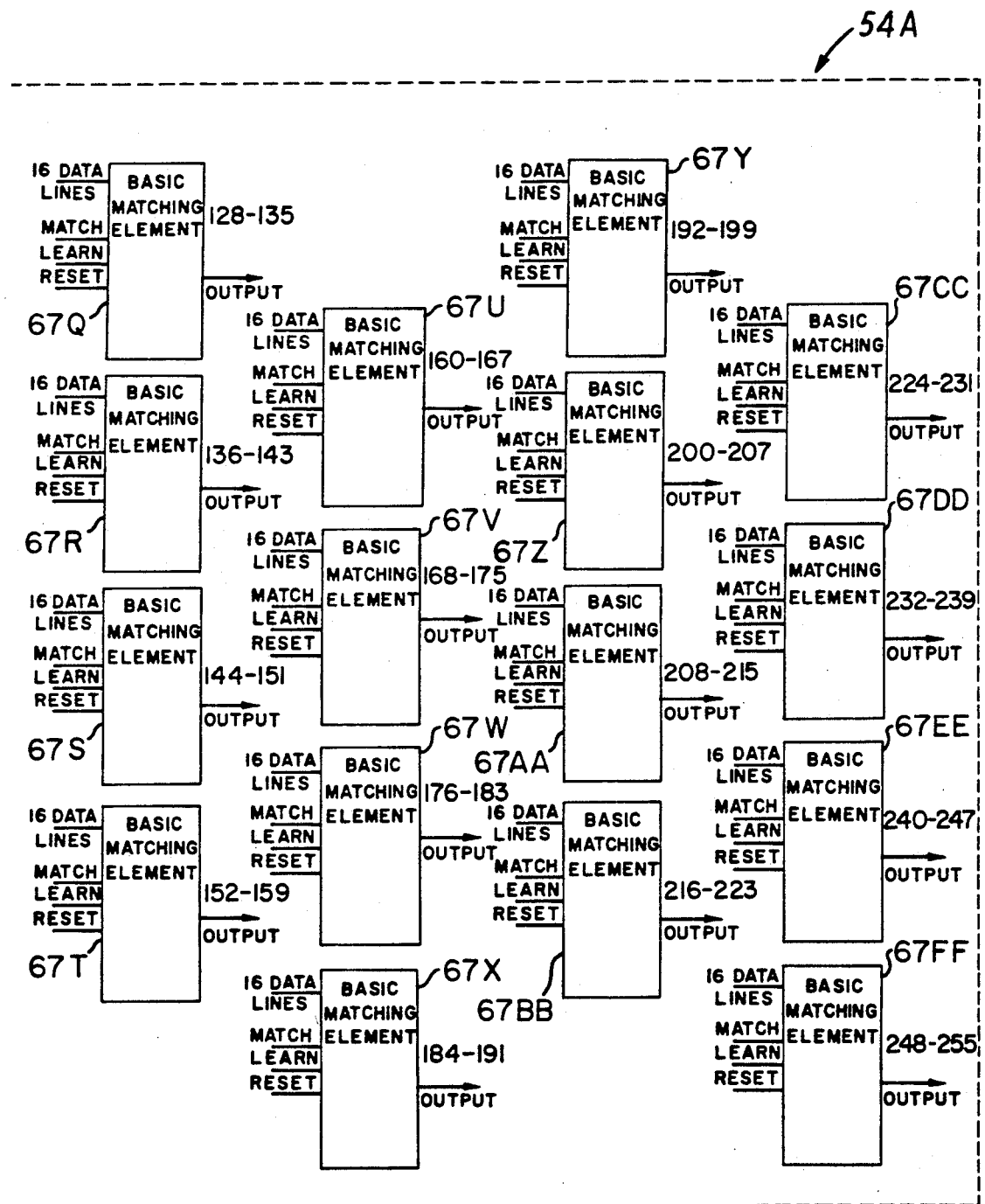
Figure 12A:
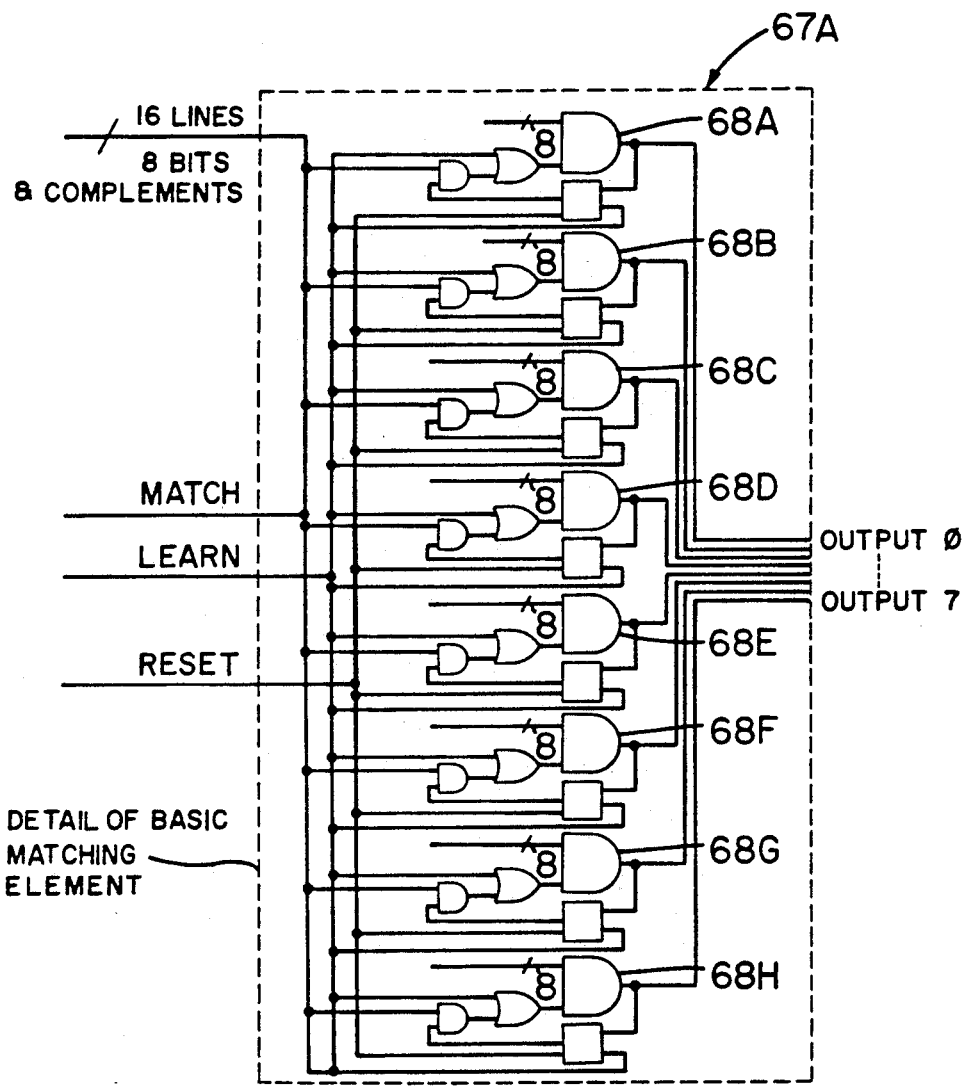
FIG. 12A shows an electrical circuit diagram of a basic matching element of the address fragment memory blocks of FIG. 11.

In FIG. 12A, basic matching element 67A of FIG. 11 is shown operates in a substantially similar manner as the circuit of FIG. 8. The only difference between the circuits is that the AND gates 68A-68H in FIG. 12A have 8 address inputs as compared to three address inputs in the FIG. 8 circuit.

Figure 12B:
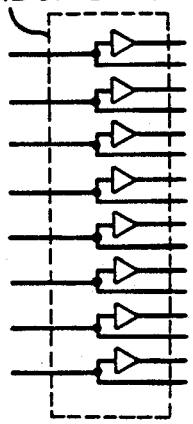
FIG. 12B shows an electrical circuit diagram of the data presenters of the address memory blocks of FIG. 11.

In FIG. 12B, the data presenter 53A of FIG. 11 is shown in more detail. The presenter comprises 8 inverters I which invert the received address bits to produce inverted and non-inverted outputs.

As can be appreciated, the recognizer 26 can be modified to handle addresses of greater than 32 bits by a modification procedure similar to that used in FIGS. 10, 11A, 11B and 12A and 12B. For LANS, which typically support addresses of 48 bits, the recognizer would be expanded to handle these number of bits.

Figure 13:
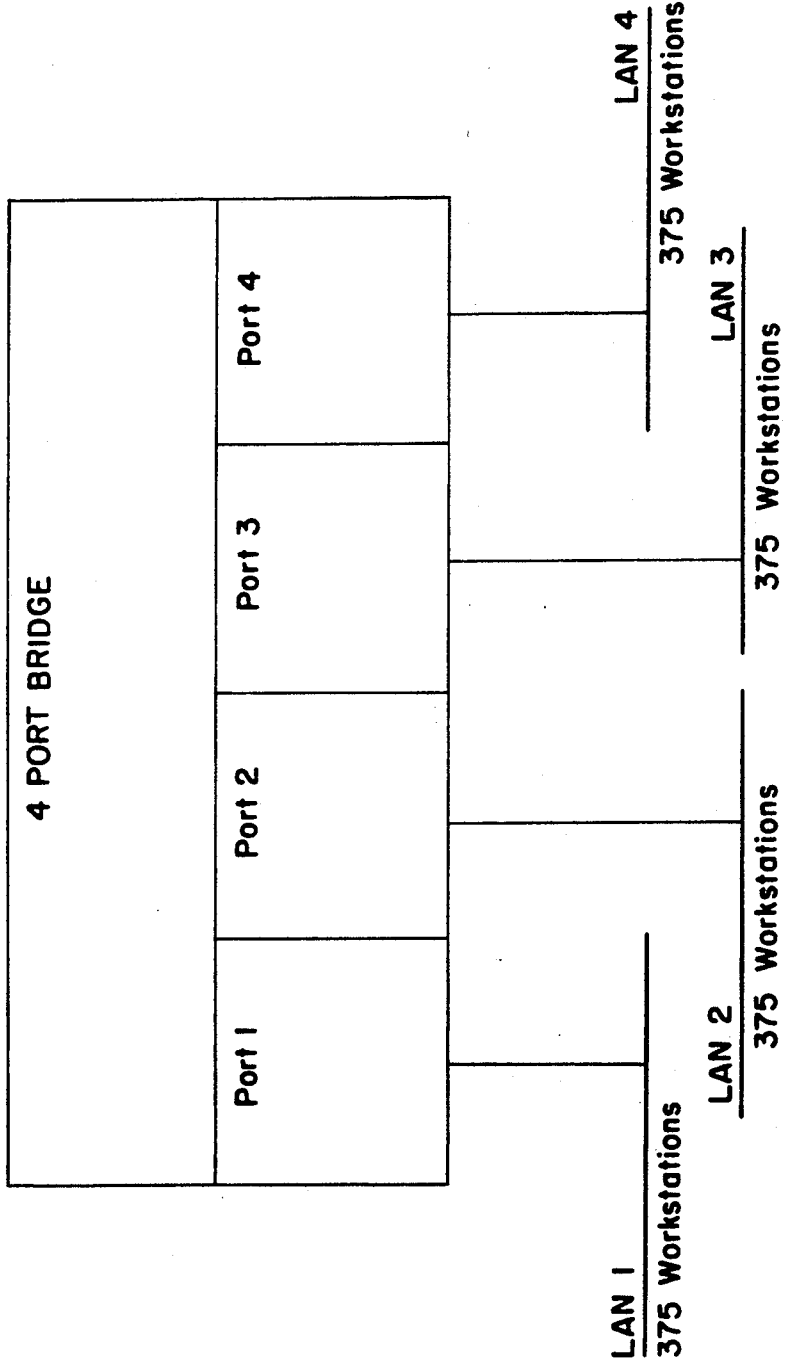
FIG. 13 shows diagrammatically a model of a four port bridge.
Figure 14:
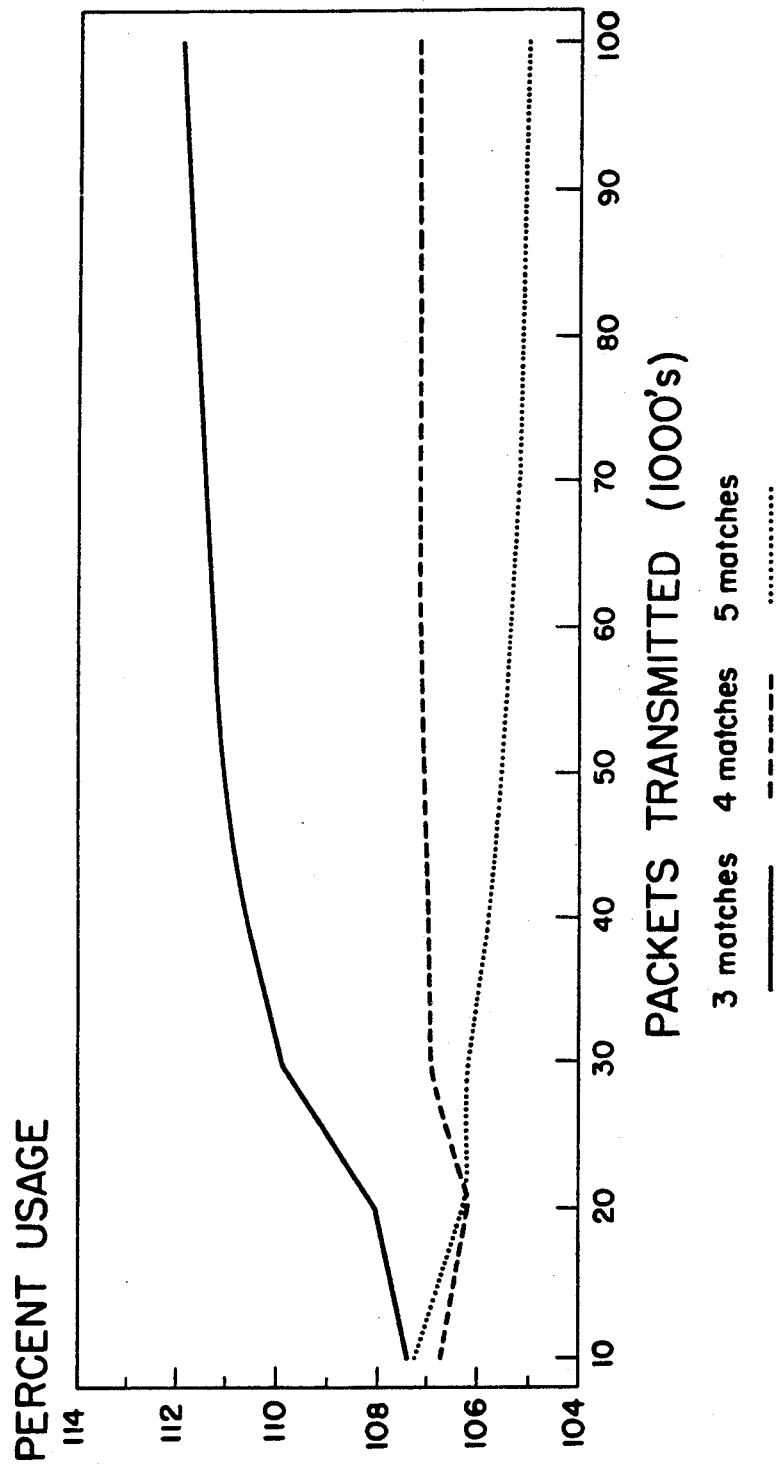
FIGS. 14 and 15 show the performance characteristics for the bridge of FIG. 13 for a simulation using the recognition apparatus of the present invention and for a simulation using a CAM recognition scheme, respectively.
Figure 15:
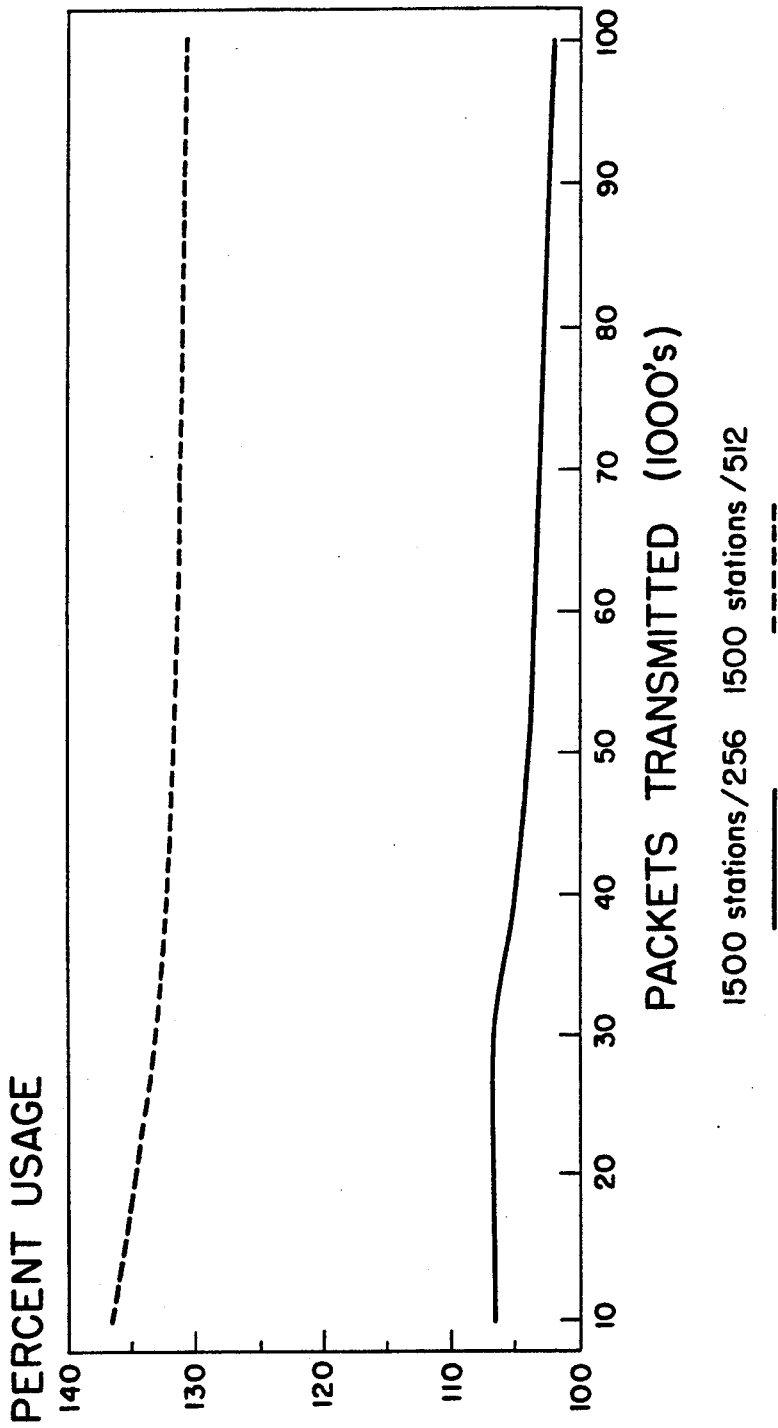

FIG. 13 shows diagrammatically a four port bridge 130 used in a simulation model to demonstrate the advantages of the present invention. The bridge 130 interconnects four LANs identified as LAN1-LAN4. Traffic originating on any one of these LANS and intended for a workstation on any other LAN is forwarded by the bridge 130. Traffic intended for the same LAN is filtered by the bridge. FIGS. 14 and 15 show percent usage vs packets transmitted for simulations of the bridge 130 using the recognizer of the invention and a CAM recognizer, respectively.

Percent usage is the percent of emissions actually used to deliver the traffic compared to what is required. It is not the percent of bandwidth.

Percentage usage is determined as follows. Each time a frame is emitted on a LAN, that it needs to be emitted on the emission is counted toward the minimum required emissions .r (MRE). Each time a frame is emitted on a LAN where it cannot reach the destination it is intended for, the emission is counted toward the non required emission count (NRE). Percent usage is then calculated using:

$$\text{Perc. Usage} = \frac{(NRE + MRE) \cdot 100}{(MRE)}$$

A percent usage of 100 for bridge 130 would be perfect operation. A percent usage greater than 100 implies some inefficiency in the use of bandwidth. The higher the number the greater the inefficiency.

FIG. 14 shows the percent usage for bridge simulations using the recognizer of the invention for cases where the recognizer is adapted to perform 3, 4 and 5 matches in reaching a recognition decision. The traces clearly show that additional matches make the system more efficient in the steady state (more than 100,000 packets transmitted in this example). Five matches give you a percent usage of about 105%, or 5% greater than a perfect system. This assumes all workstation are concurrently active.

FIG. 15 shows the percentage usage for a bridge simultation using a 256 address CAM for the recognizer. For only 256 stations concurrently active, the percent usage is approaching 100% (about 102% on the trace at 100,000 packets). For 512 stations concurrently active, the percent usage is about 130% or 25% greater than that shown in FIG. 14 for the bridge simulation using the five match recognizer of the invention. This 25% difference results with only ½ of the workstations active. If all the workstations were active, the 256 address CAM would not be able to handle the traffic.

As above-indicated, the type of scrambling used in the recognizer of the invention can take on a variety of forms. It includes orderly single and multiple bit shifts and rotations in the original station address.

It should be noted that the recognizer of invention can be implemented in a number of ways including, but not limited to the use of combinatorial (not sequential) logic in the time critical decisions (address matching). This allows the recognizer to be applied to much higher speed LANs than are commonly found. Also the invention is able to work efficiently with very high numbers of workstations (greater than 4000) and still work very well with low numbers of workstations.

Additionally, the recognizer can also be employed where an absolute unique determination of a network routing solution is not required. For example, in making a good, but not necessarily optimal, route choice through a network where a number of routes exist between 2 endpoints.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention. Thus, for example, the recognizer of the invention can be implemented in software and also can be utilized in other networks and systems where address recognition is required.

What is claimed is:

1. Apparatus for use with information packets, said information packets each including source and destination addresses each comprised of a sequence of address parts, said apparatus comprising:

means for receiving said information packets;

first means responsive to said receiving means for: segmenting the destination address of a received packet into first fragments each containing different address parts of said destination address; determining for each particular first fragment whether the particular first fragment corresponds to any one of first stored representations of associated fragments of source addresses; and making a first match determination when all the first segments are determined to correspond to respective first stored representations;

and second means responsive to said receiving means for: scrambling said destination address of said received packet and segmenting said scrambled destination address into second fragments each containing different address parts of said scrambled destination address and at least one of which is different from said first fragments due to said scrambling; determining for each particular second fragment whether the particular second fragment corresponds to any one of second stored representations of associated fragments of scrambled source addresses; and making a second match determination when all the second fragments are determined to correspond to respective second stored representations.

2. Apparatus in accordance with claim 1 wherein:

said associated fragments of source addresses are formed by segmenting said source addresses in like manner as said first means segments said destination address;

and said associated fragments of scrambled source addresses in like manner as said second means segments and scrambles said destination address 3. Apparatus in accordance with claim 1 further comprising:

third means responsive to said first and second means for making a recognition that said destination address of said received packet corresponds to one of said source addresses only when said first and second means make said first and second match determinations.

4. Apparatus in accordance with claim 1 further comprising:

one or more further means, each further means for: further scrambling said destination address of said received packet and segmenting said further scrambled destination address into further fragments each containing different address parts of said further scrambled destination address and at least one of which is different from said first fragments, said second fragments and the further fragments of each of the other one o more further means due to said scrambling; determining for each particular further fragment whether the particular further fragment corresponds to any one of further stored representations of further associated fragments of said source addresses; and making a further match determination when all of said further fragments are determined to correspond to respective further stored representations.

5. Apparatus in accordance with claim 3 further comprising:
third means responsive to said first, second and one or more further means for making a recognition that said destination address of said received packet corresponds to one of said source addresses only when said first, second and one or more further means make said first, second and further match determinations.

6. Apparatus in accordance with claim 5 wherein: said first, second and one or more further means operate on said destination addresses simultaneously.

7. Apparatus in accordance with claim 1 wherein: each of said addresses comprises a number of bits and each address part comprises one of the number of bits.

8. Apparatus in accordance with claim 7 wherein: each bit is expressed in binary.

9. Apparatus in accordance with claim 8 wherein: said number of bits is 48.

10. Apparatus in accordance with claim 9 wherein: each of said address fragments comprises 8 bits.

11. Apparatus in accordance with claim 1 wherein: said first and second means operate on said destination addresses simultaneously.

12. Apparatus in accordance with claim 1 wherein:
said first means is further for: segmenting the source address of each received packet into fragments containing different address parts of the source address and storing representations of said source address fragments to provide said first stored representations;
and said second means is further for: scrambling and segmenting the source address of each received packet into fragments containing different address parts of the scrambled source address fragments to provide said second stored , representations.

13. Apparatus in accordance with claim 12 wherein:
said segmenting of each source address by said first means is in like manner as the segmenting of said destination address by said first means;
and said scrambling and segmenting each source address by said second means is in like manner as the scrambling and segmenting of said destination address by said second means.

14. Apparatus in accordance with claim 3 wherein:
said apparatus is a bridge means for selectively coupling said information packets between first and second LANs having stations connected thereto which have addresses;
each of said source and destination addresses of an information packet is an address of a station;
and said bridge means when said third means makes said recognition filters said received packet and does not forward said received packet from one of said LANs to the other and when said third means does not make said recognition forwards said 15. Apparatus in accordance with claim 1 wherein:
said receiving and first and second means are implemented by hardware.

16. A system comprising:
first and second LANs each adapted to be connected to one or more stations, each of said stations having an address and each of said stations being adapted to couple to and from said LANs information packets each of which contains a source and destination station address;
bridge means connecting said first and second LANs and receiving information packets traveling on said LANs, said bridge means filtering and not forwarding an information packet received from one of said LANs to the other of said LANs when said bridge means makes a recognition that the destination station address of said received packet is an address of a station on said one LAN and forwarding said received packet from said one of said LANs to other of said LANs when said bridge means fails to make said recognition, said bridge means including recognizer means comprising:
first means for: segmenting the destination station address of said received packet into first fragments each containing different station address parts of said destination address; determining for each particular first fragment whether the particular first fragment corresponds to any one of first stored representations of associated fragments of source station addresses of stations on said one LAN; and making a first match determination when all the first segments are determined to correspond to respective first stored representations;
second means for: scrambling said destination station address of said received packet and segmenting said scrambled destination station addresses into second fragments each containing different address parts of said scrambled destination station address and at least one of which is different from said first fragments due to said scrambling; determining for each particular second fragment whether the particular second fragment corresponds to any one of second stored representations of associated fragments of scrambled source station addresses of stations on said one LAN; and making a second match determination when all the second fragments are determined to correspond to respective second stored representations; and
third means responsive to said first and second means for making a recognition that said destination station address of said received packet corresponds to one of said source station addresses of stations on said one LAN only when said first and second means make said first and second match determinations.

17. Apparatus in accordance with claim 3 wherein:
said associated fragments of source addresses contain address parts from the same positions and in the same sequences in their source addresses as the positions and sequence of the associated first fragment address parts in their respective destination address;
and said associated fragments of scrambled source addresses contain address parts from the same positions and in the same sequences in their source addresses as the positions and sequences of the associated second fragment and address parts in their respective scrambled destination address.

18. Apparatus in accordance with claim 17 wherein:
the fragments of said source addresses which are the same and which are associated with the same first fragment have the same first stored representation;
the fragments of said scrambled source addresses which are the same and which are associated with the same second segment have the same second stored representation.

19. A method for use with information packets, said information packets each including source and destination addresses each comprised of a sequence of address parts, said method comprising:
segmenting the destination address of a received packet into first fragments each containing different address parts of said destination address;
determining for each particular first fragment whether the particular first fragment corresponds to any one of first stored representations of associated fragments of source addresses;
making a first match determination only when all the first segments are determined to correspond to respective first stored representations;
scrambling said destination address of said received packet and segmenting said scrambled destination address into second fragments each containing different address parts of said; scrambled destination address and at least one of which is different from said first fragments due to said scrambling;
determining of each particular second fragment whether the particular second fragment corresponds to any one of second stored representations of associated fragments of scrambled source addresses;
and making a second match determination only when all the second fragments are determined to correspond to respective second stored representations.

20. Method in accordance with claim 19 wherein:
said associated fragments of source addresses are formed by segmenting said source addresses in like manner as said destination address is segmented;
and said associated fragments of scrambled source addresses are formed by scrambling said source addresses and segmenting said scrambled source addresses in like manner as said destination address is scrambled and segmented.

21. A method in accordance with claim 19 further comprising:
repeating the following one or more times:
making a recognition that said destination address of said received packet corresponds to one of said source addresses only when said first and second match determinations are made.

22. A method in accordance with claim 19 further comprising:
repeating the following one or more times:
further scrambling said destination address of said received packet and segmenting said further scrambled destination address into further fragments each containing different address parts of said further scrambled destination address and at least one of which is different from said first fragments, said second fragments and the further fragments of each of the other of the repeated steps of further scrambling and segmenting; determining for each particular further fragment whether the particular further fragment corresponds to any one of further stored representations of further associated 1 fragments of said source addresses; and making a further match determination when all of said further fragments are determined to correspond to respective further stored representations.

23. A method in accordance with claim 22 further comprising:
making a recognition that said destination address of said received packet corresponds to one of said source addresses only when said first, second and one or more further match determinations are made.

24. A method in accordance with claim 23 wherein:
said segmenting step and said scrambling and segmenting steps are carried out simultaneously;
and said match determination steps are carried out simultaneously.

25. A method in accordance with claim 21 wherein:
each of said addresses comprises a number of bits and each address part comprises one of the number of bits.

26. A method in accordance with claim 25 wherein: p each bit is expressed in binary.

27. A method in accordance with claim 26 wherein:
said number of bits is 48.

28. A method in accordance with claim 27 wherein:
each of said address segments comprises 8 bits.

29. A method in accordance with claim 21 wherein:
said segmenting step and said scrambling and segmenting steps are carried out simultaneously;
said determining steps are carried out simultaneously;
and said match determination steps are carried out 30. A method in accordance with claim 19 further comprising:
segmenting the source address of each received packet into fragments containing different address parts of the source . address and storing representations of said source address fragments to provide said first stored representations;
scrambling and segmenting the source address of each received packet into fragments containing different address parts of the scrambled source address and storing representations of the scrambled source address fragments to provide said second stored representations.

31. A method in accordance with claim 32 wherein:
said segmenting of each source address is in like manner as the segmenting of said destination address;
and said scrambling and segmenting each source address is in like manner as the scrambling and segmenting of said destination address.

32. A method in accordance with claim 21 further comprising:
selectively bridging said information packets between first and second LANs having stations connected thereto which have addresses;
each of said source and destination addresses of an information packet is an address of a station;
and said bridging step filters said received packet and does not forward said received packet from one of said LANs to the other when said recognition is made and forwards said received packet from one of said LANs to the other when said recognition is not made.

33. A method in accordance with claim 31 wherein:
said associated fragments of source addresses contain address parts from the same positions and in the same sequences in their source addresses as the positions and sequence of the associated first fragment address parts in their respective destination address;

and said associated fragments of scrambled source addresses contain address parts from the same positions and in the same sequences in their source addresses as the positions and sequences of the associated second fragment and address parts in their respective scrambled destination.

34. A method in accordance with claim 33 wherein: the fragments of said source addresses which are the same and which are associated with the same first fragment have the same first stored representation; and the fragments of said scrambled source addresses which are the same and which are associated with the same second segment have the same second stored representation.

* * * * *

UNITED STATES PATENT AND TRADEMARK OFFICE
CERTIFICATE OF CORRECTION

PATENT NO. : 5,111,453
DATED : May 5, 1992
INVENTOR(S) : Joel I. Morrow

Page 1 of 2

It is certified that error appears in the above-identified patent and that said Letters Patent is hereby corrected as shown below:

Col. 1, line 19.  Change "20-100stations" to -- 20-100 stations --

Col. 3, line 21.  Delete ".1"

Col. 4, line 12.  Change "t e" to -- the --

Col. 5, line 29.  Change "N!" to -- N1 --

Col. 6, line 52.  After "address" insert -- lines 30 to the second memory block. By doing so, the address --

Col. 9, line 9.   Change ""3h"" to -- 3 --

Col. 9, line 11.  After ""3"" (second occurrence) insert -- fragment previously stored. Therefore, 03 (the output of the --

Col. 9, line 68.  After "the" insert -- input of address fragment memory blocks 54A-54D, respectively --

Col. 10, line 45. Change "FIG. 11A," to -- FIGS. 11A and 11B, --

Col. 10, line 54. Change "FIG. 11" to -- FIG. 11A --

Col. 10, line 55. After "shown" insert -- in greater detail. The circuit in FIG. 12 is similar to and --

Col. 10, line 60. Change "FIG. 11" to -- FIG. 10 --

Col. 11, line 18. Delete ".r"

Col. 12, line 52. After "addresses" insert -- are formed by scrambling and segmenting said source addresses --

Col. 13, line 3.  Change "o" to -- or --

UNITED STATES PATENT AND TRADEMARK OFFICE
CERTIFICATE OF CORRECTION

PATENT NO. : 5,111,453
DATED : May 5, 1992  Page 2 of 2
INVENTOR(S) : Joel I. Morrow It is certified that error appears in the above-identified patent and that said Letters Patent is hereby corrected as shown below:

| | |
|---|---|
| Col. 13, line 47. | After "address" insert -- and storing representations of the scrambled source address -- |
| Col. 13, line 48. | Delete "," |
| Col. 13, line 68. | After "said" insert -- received packet from one of said LANs to the other. -- |
| Col. 15, line 26. | Change "said;" to -- said -- |
| Col. 15, line 29. | Change "of" to -- for -- |
| Col. 15, line 68. | Delete "1" |
| Col. 16, line 14. | After "simultaneously;" insert -- said determining steps are carried out simultaneously; -- |
| Col. 16, line 20. | Delete "p" |
| Col. 16, line 30. | After "out" insert -- simultaneously -- |
| Col. 16, line 35. | Delete "." |

Signed and Sealed this

Third Day of August, 1993

Attest:

MICHAEL K. KIRK

*Attesting Officer*   Acting Commissioner of Patents and Trademarks